US010259377B2

(12) United States Patent
Kennemer et al.

(10) Patent No.: US 10,259,377 B2
(45) Date of Patent: Apr. 16, 2019

(54) VEHICLE LIGHT BAR WITH STRAIGHT AND CURVED FRAME PORTIONS

(71) Applicant: Tractor Supply Company, Brentwood, TN (US)

(72) Inventors: Brian Kennemer, Chapel Hill, TN (US); Christian D. Fogg, Columbia, TN (US); Ty Rager, Hendersonville, TN (US); Adam Prater, Thompson Station, TN (US)

(73) Assignee: TRACTOR SUPPLY COMPANY, Nashville, TN (US)

( * ) Notice: Subject to any disclaimer, the term of this patent is extended or adjusted under 35 U.S.C. 154(b) by 0 days.

(21) Appl. No.: 15/411,802

(22) Filed: Jan. 20, 2017

(65) Prior Publication Data
US 2018/0208104 A1 Jul. 26, 2018

(51) Int. Cl.
B60Q 1/02 (2006.01)
B60Q 1/00 (2006.01)
B60Q 1/04 (2006.01)
B60Q 1/18 (2006.01)
B60Q 1/24 (2006.01)
F21S 41/19 (2018.01)
F21S 41/143 (2018.01)
F21S 41/29 (2018.01)
F21S 41/20 (2018.01)
F21S 41/39 (2018.01)
F21S 41/32 (2018.01)
F21S 41/33 (2018.01)
F21S 45/47 (2018.01)
F21S 41/153 (2018.01)

(52) U.S. Cl.
CPC .......... *B60Q 1/0035* (2013.01); *B60Q 1/0483* (2013.01); *B60Q 1/18* (2013.01); *B60Q 1/24* (2013.01); *F21S 41/143* (2018.01); *F21S 41/153* (2018.01); *F21S 41/19* (2018.01); *F21S 41/28* (2018.01); *F21S 41/29* (2018.01); *F21S 41/321* (2018.01); *F21S 41/331* (2018.01); *F21S 41/39* (2018.01); *F21S 45/47* (2018.01)

(58) Field of Classification Search
CPC ...... F21S 4/20; F21S 4/28; B60Q 1/02; B60Q 1/18; F21V 21/025; F21W 2102/00; F21Y 2103/10; F21Y 2105/10; F21Y 2105/14
See application file for complete search history.

(56) References Cited

U.S. PATENT DOCUMENTS

| 4,791,402 | A | 12/1988 | Vaughn |
| 4,816,968 | A | 3/1989 | Yamada et al. |
| 5,101,326 | A | 3/1992 | Roney |
| 5,188,445 | A | 2/1993 | Haun et al. |
| 5,309,277 | A | 5/1994 | Deck |
| 5,373,426 | A | 12/1994 | O'Sullivan |
| 5,798,691 | A | 8/1998 | Kao |
| 5,988,840 | A | 11/1999 | Wirtz |
| D418,929 | S | 1/2000 | Allen |

(Continued)

Primary Examiner — Ismael Negron
(74) Attorney, Agent, or Firm — Lucian Wayne Beavers; Alex H. Huffstutter; Patterson Intellectual Property Law, PC

(57) ABSTRACT

A lighting apparatus includes a frame having a straight central portion and first and second curved end portions, a plurality of spot light sources mounted on the straight central portion and aligned parallel to each other, and a plurality of diffuse light sources may be mounted on each of the curved end portions.

13 Claims, 8 Drawing Sheets

(56) References Cited

U.S. PATENT DOCUMENTS

| | | | |
|---|---|---|---|
| 6,190,026 B1 | 2/2001 | Moore | |
| 6,511,216 B2* | 1/2003 | Strickland | B60Q 1/2611 362/490 |
| 6,520,669 B1 | 2/2003 | Chen et al. | |
| 6,561,690 B2 | 5/2003 | Balestiero et al. | |
| 6,592,238 B2 | 7/2003 | Cleaver et al. | |
| 6,623,151 B2* | 9/2003 | Pederson | B60Q 1/2611 362/542 |
| 6,986,597 B2 | 1/2006 | Elwell | |
| 7,036,965 B2* | 5/2006 | Dalton, Jr. | B60Q 1/268 362/240 |
| D526,430 S | 8/2006 | Hernandez et al. | |
| 7,095,318 B1 | 8/2006 | Bekhor | |
| D530,029 S | 10/2006 | Neufeglise et al. | |
| 7,163,320 B2 | 1/2007 | Liu | |
| 7,217,004 B2 | 5/2007 | Park et al. | |
| 7,387,414 B2* | 6/2008 | Helms | B60Q 1/18 362/288 |
| D576,754 S | 9/2008 | Wang | |
| 7,695,164 B2 | 4/2010 | Berben et al. | |
| 7,726,845 B2 | 6/2010 | Zheng et al. | |
| 7,758,211 B2 | 7/2010 | Zheng et al. | |
| 7,806,560 B2 | 10/2010 | Schultz et al. | |
| 7,950,821 B1* | 5/2011 | Georgitsis | B60Q 1/18 362/217.12 |
| D642,302 S | 7/2011 | Schiavone et al. | |
| D643,951 S | 8/2011 | Cai | |
| 8,092,049 B2 | 1/2012 | Kinnune et al. | |
| D653,783 S | 2/2012 | Biro et al. | |
| 8,220,976 B2 | 7/2012 | Liu et al. | |
| 8,246,219 B2 | 8/2012 | Teng et al. | |
| 8,313,222 B2 | 11/2012 | Kinnune et al. | |
| 8,317,369 B2 | 11/2012 | McCanless | |
| D676,990 S | 2/2013 | Adams | |
| 8,430,195 B2 | 4/2013 | Jansen et al. | |
| 8,591,057 B2 | 11/2013 | Kawabata et al. | |
| D713,574 S | 9/2014 | Adams | |
| 8,888,306 B2 | 11/2014 | Thomas et al. | |
| 8,974,102 B2* | 3/2015 | Paine | B60Q 1/0483 362/544 |
| 8,979,303 B2* | 3/2015 | Adams | F21K 9/30 362/235 |
| 9,096,172 B2* | 8/2015 | Cotta, Sr. | B60Q 1/18 |
| D740,473 S | 10/2015 | Chen | |
| D749,253 S | 2/2016 | Marroquin | |
| D751,753 S | 3/2016 | Adams et al. | |
| D759,278 S | 6/2016 | Kim | |
| D772,454 S | 11/2016 | Ma | |
| D775,751 S | 1/2017 | Jones, Jr. | |
| D776,314 S | 1/2017 | Aho | |
| 9,534,770 B2* | 1/2017 | Lin | F21V 15/04 |
| D781,474 S | 3/2017 | Graham et al. | |
| D782,090 S | 3/2017 | Graham et al. | |
| 9,617,699 B2* | 4/2017 | Westman | E01H 5/066 |
| D809,168 S | 1/2018 | Kennemer et al. | |
| 2004/0170017 A1 | 9/2004 | Zhan et al. | |
| 2008/0290357 A1 | 11/2008 | Lin et al. | |
| 2009/0323342 A1 | 12/2009 | Liu | |
| 2010/0073637 A1 | 3/2010 | Matsumoto et al. | |
| 2010/0091507 A1 | 4/2010 | Li et al. | |
| 2010/0328947 A1 | 12/2010 | Chang et al. | |
| 2011/0176297 A1 | 7/2011 | Hsia et al. | |
| 2011/0233568 A1 | 9/2011 | An et al. | |
| 2013/0107519 A1 | 5/2013 | Kim et al. | |
| 2014/0016313 A1 | 1/2014 | Adams | |
| 2014/0078762 A1* | 3/2014 | Adams | B60Q 1/18 362/496 |
| 2014/0268771 A1 | 9/2014 | Heikman | |
| 2016/0076748 A1* | 3/2016 | Sievers | H05B 37/00 362/231 |
| 2016/0258598 A1 | 9/2016 | Adams | |
| 2017/0297480 A1* | 10/2017 | Elwell | F21S 45/50 |

* cited by examiner

VEHICLE LIGHT BAR WITH STRAIGHT AND CURVED FRAME PORTIONS

BACKGROUND OF THE INVENTION

1. Field of the Invention

The present invention relates generally to light bars for mounting on the cab of a pickup truck or the like.

2. Description of the Prior Art

Light bars are often mounted at various locations on trucks and other off-road vehicles to provide auxiliary lighting. One potential location for such light bars is adjacent the top front edge of the cab of the truck. Traditionally, such light bars have either been straight light bars or curved light bars.

There is a continuing need for improvements in such light bars and their manner of construction and in their manner of fit to the vehicles upon which they are used.

SUMMARY OF THE INVENTION

A lighting apparatus for mounting on the vehicle cab includes a frame. The frame has a straight central portion and first and second curved end portions on either end of the straight central portion. The straight central portion has a central portion length. The frame has a forward facing light mounting surface. The first and second curved end portions are curved rearwardly relative to the straight central portion. A plurality of central light sources are mounted on the straight central portion. The central light sources each have a light-emitting axis projecting forward from and perpendicular to the central portion length so that the light-emitting axes of the plurality of central light sources project parallel to each other. A plurality of first end portion light sources are mounted on the first curved end portion. A plurality of second end portion light sources are mounted on the second curved end portion.

In one embodiment, at least a majority of the central light sources are spot light sources, and at least a majority of the first end portion light sources and at least a majority of the second end portion light sources are diffuse light sources. The spot light sources and diffuse light sources are defined relative to each other, with the spot light sources being more directionally concentrated than the diffuse light sources.

In any of the above embodiments, all of the central light sources may be spot light sources.

In any of the above embodiments, the plurality of first end portion light sources may include at least one spot light source adjacent to the central light sources, and the plurality of second end portion light sources may include at least one spot light source adjacent to the central light sources.

In any of the above embodiments, the first end portion light sources may each have a light-emitting axis projecting forward from and perpendicular to the first curved end portion, and the second end portion light sources may each have a light-emitting axis projecting forward from and perpendicular to the second curved end portion.

In any of the above embodiments, the frame may have a frame length from an end of the first curved end portion to an end of the second curved end portion, and a central frame portion length of the straight central portion may be at least 40% of the frame length. Optionally, the central frame portion length may be at least 45% of the frame length.

In any of the above embodiments, the central portion frame length may be at least 22 inches.

In any of the above embodiments, each of the first and second curved end portions of the frame may have an end portion length of at least 12 inches.

In any of the above embodiments, the frame may be a continuous extrusion from an end of the first curved end portion to an end of the second curved end portion.

In any of the above embodiments, the frame may include cooling fins, extending rearward, the frame having a cross-section having cross-sectional shape such that a cross-sectional profile of the rear ends of the fins has an abrupt decrease in fin length adjacent upper and lower edges of the cross-section.

In any of the above embodiments, a transparent cover may be mounted on the frame in front of the light sources. Upper and lower trim strips may be attached to the upper and lower front edges of the frame to retain the transparent cover. Upper and lower support pads may protrude forward from the upper and lower trim strips, respectively, the support pads being located along the straight central portion of the frame nearer to the first and second curved end portions than to a center of the frame.

In any of the above embodiments, the apparatus may be mounted to a truck cab using first and second end brackets. Each end bracket may have an upper flange configured to attach to the ends of the first and second curved end portions of the frame, and each bracket may have a lip configured to attach to an A-pillar of a truck on which the apparatus is to be mounted.

Numerous objects, features and advantages of the present invention will be readily apparent to those skilled in the art upon reading of the following disclosure when taken in conjunction with the accompanying drawings.

DETAILED DESCRIPTION

Figure 1:
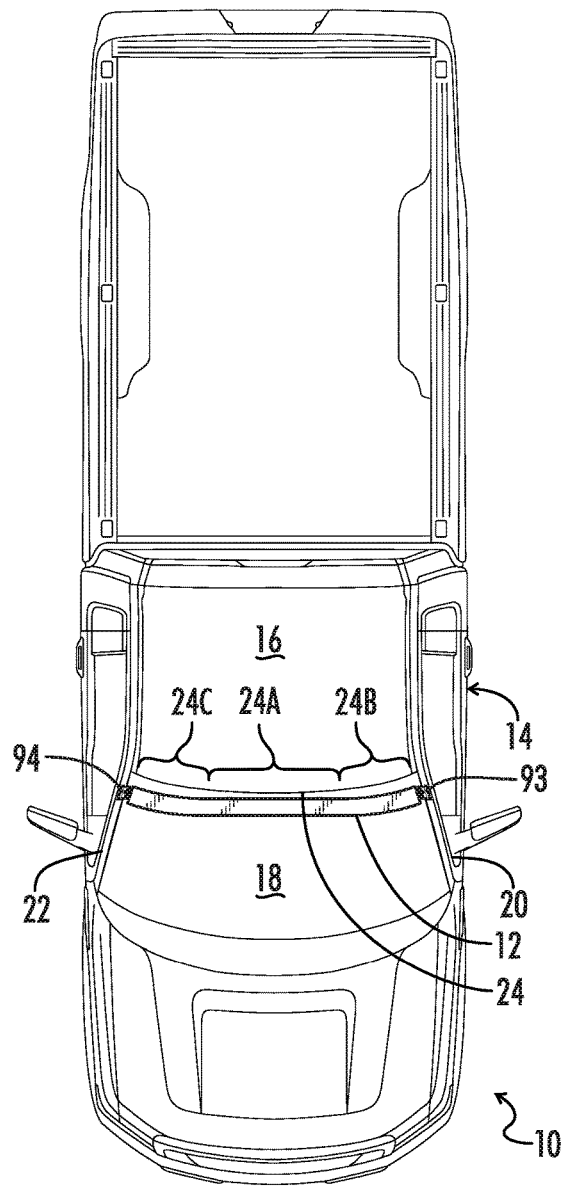
FIG. 1 is a plan view of a pickup truck showing the lighting apparatus of the present invention mounted thereon.
Figure 2:
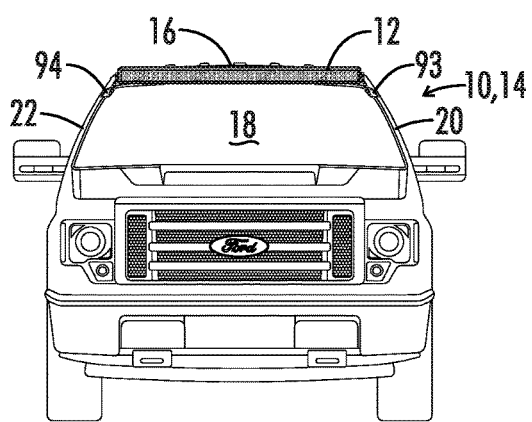
FIG. 2 is a front elevation view of the truck of FIG. 1 showing the lighting apparatus of the present invention mounted thereon.

Referring now to the drawings, and particularly to FIGS. 1 and 2, a vehicle 10, which, in the illustrated embodiment is a pickup truck, has the lighting apparatus 12 of the present invention mounted thereon. The vehicle 10 may be referred to as a pickup truck 10.

The vehicle 10 has a cab portion 14, which may include a roof 16, a windshield 18, and left and right A-pillars 20 and 22 extending downward from the roof 16 on either side of the windshield 18.

As seen in FIG. 1, the roof 16 of the cab portion 14 has a forward edge 24. In many modern pickup trucks, the forward edge 24 of the roof 16 has a central most portion 24A which is relatively straight, or at least much less sharply curved than are the left and right end portions 24B and 24C of the forward edge 24 of the roof 16 of the vehicle 10.

Traditional straight light bars do not fit well adjacent the forward edge of the cab of modern pickup trucks because the straight light bars typically are spaced too far forward from the forward edge of the cab near their outer ends. Traditional curved light bars do not fit well with the roof line of modern pickup trucks because their central curved portions cannot be fitted closely adjacent a relatively straight central portion 24A of the forward edge 24 of the cab of a modern pickup truck.

On the other hand, it is not practical for manufacturing purposes to custom design light bars to fit the exact profile of each and every popular model of pickup truck.

The present invention addresses this problem and provides a solution having an improved fit to modern pickup truck cabs for most available modern full-size pickup trucks while still utilizing either a single universal fit size for all modern full-size pickup trucks, or relatively few sizes to satisfy the needs of all modern full-size pickup trucks.

Figure 3:
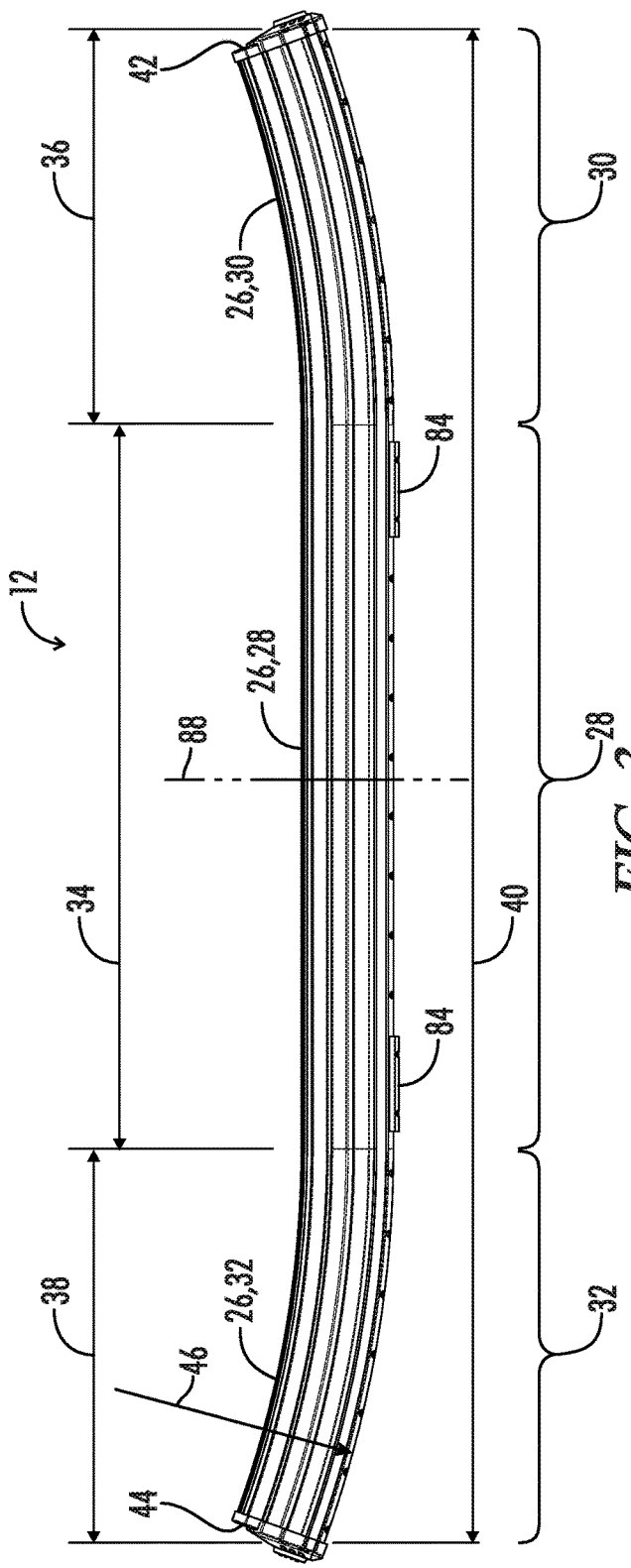
FIG. 3 is a plan view of the lighting apparatus.
Figure 4:
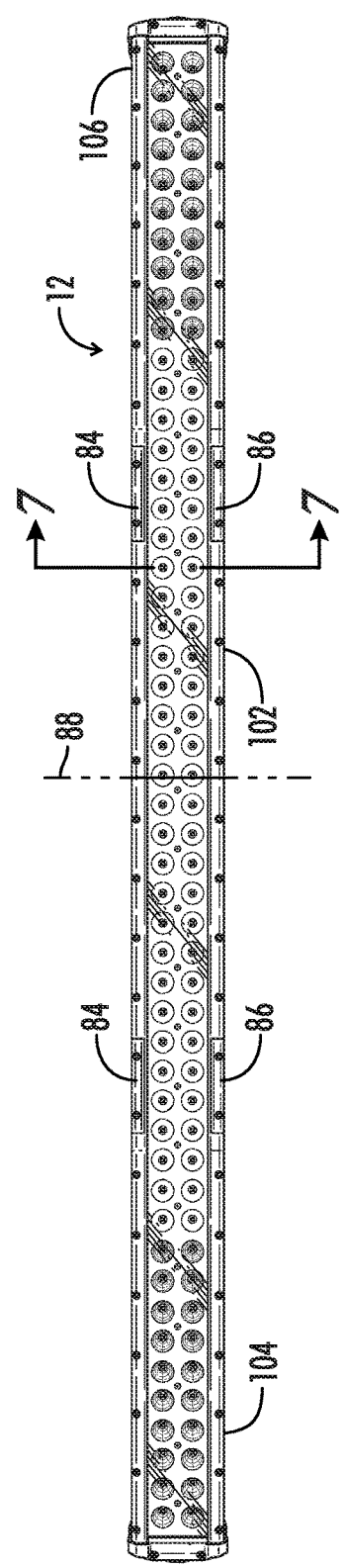
FIG. 4 is a front elevation view of the lighting apparatus.
Figure 7:
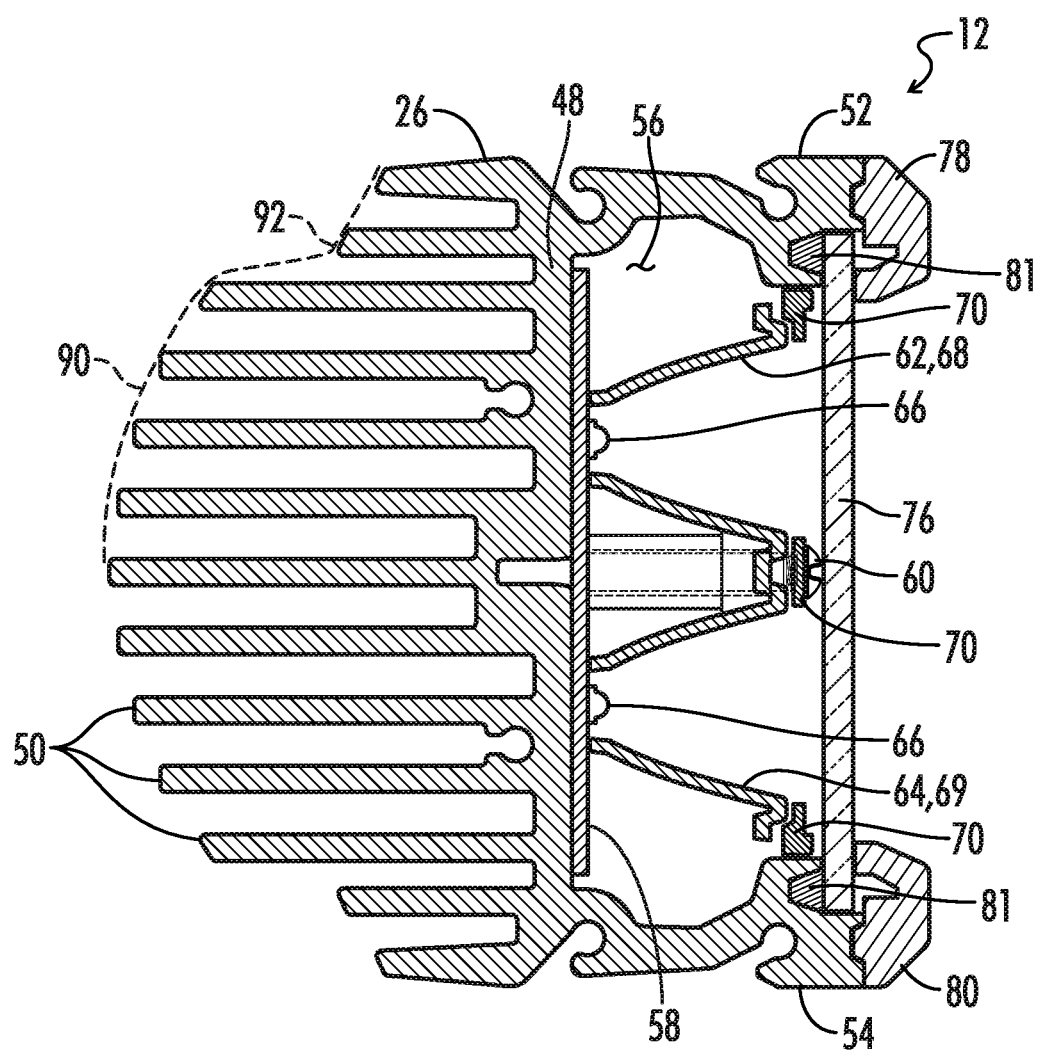
FIG. 7 is a cross-sectional view of the frame taken along line 7-7 shown in FIG. 4.

This is accomplished with the lighting apparatus 12 the details of which are best seen in FIGS. 3-5. The lighting apparatus 12 includes a frame 26 which preferably has a cross-section as seen in FIG. 7. Frame 26 may be a continuous extrusion of metal, preferably aluminum or an aluminum alloy. The frame 26 has a straight central portion 28 and first and second curved end portions 30 and 32 on either end of the straight central portion 28. The first curved end portion 30 may be referred to as a first curved frame portion 30. The second curved end portion 32 may be referred to as a second curved frame portion 32. Using the traditional reference directions for the vehicle 10, the first curved end portion 30 may be described as a left end portion or driver's side end portion as viewed from the driver's position of the truck 10, and the second end portion 32 may be described as a right end or passenger side end portion. The straight central portion 28 has a central portion length 34. The central portion length 34 may be referred to as a central frame portion length 34 or a central portion frame length 34. The first curved end portion 30 has an end portion length 36. The second end portion 32 has an end portion length 38.

The frame 26 has a frame length 40 from an end 42 of the first curved end portion 32 to an end 44 of the second curved end portion 32.

The second curved end portion 32 has a radius of curvature 46. The first curved end in portion 30 has a similar radius of curvature.

In one embodiment, the central portion length 34 may be approximately 24 inches, and each of the end portion lengths 36 and 38 may be approximately 14 inches, so that the frame length 40 is approximately 52 inches. The radius of curvature 46 may be approximately 38 inches.

More generally, in one embodiment, the straight central portion 28 may have a central portion length 34 of at least 22 inches, and each of the first and second curved end portions 30 and 32 may have an end portion length 36 and 38 of at least 12 inches. Such embodiment may be described as having a central portion length 34 at least 40% of the frame length 40. More preferably, the central portion length 34 may be at least 45% of the frame length 40. Such embodiment may be further described as having a central portion length 34 in the range of from 40% to 50% of the frame length 40.

Referring now to FIG. 7, the cross-sectional shape of the frame 26 is shown. A substantially vertical central mounting wall 48 has a plurality of cooling fins 50 extending rearwardly therefrom, and has upper and lower walls 52 and 54 extending forward therefrom. The central mounting wall 48 and upper and lower walls 52 and 54 define an electronics housing chamber 56 there between.

Figure 5A:
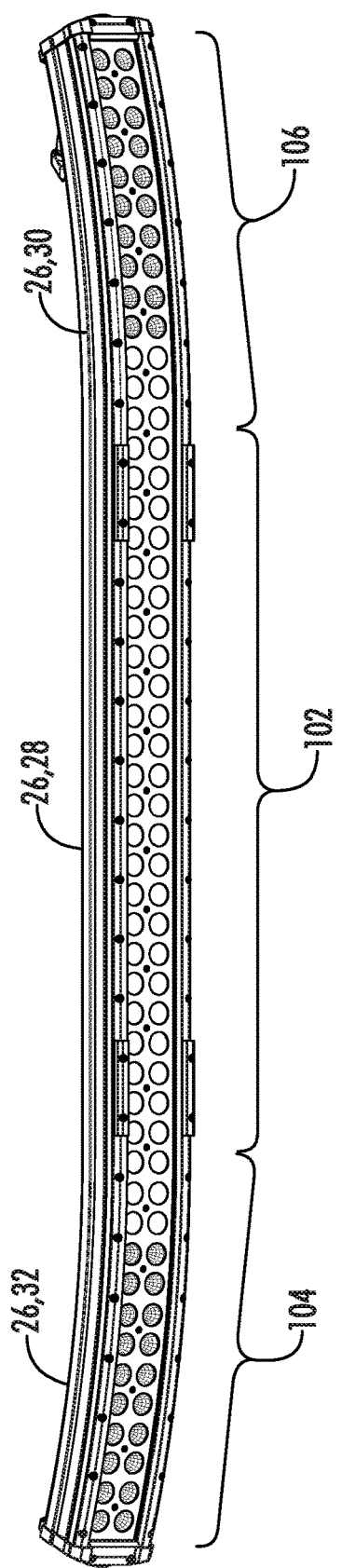
FIG. 5A is a front upper perspective view of the lighting apparatus of FIGS. 3 and 4.
Figure 5B:
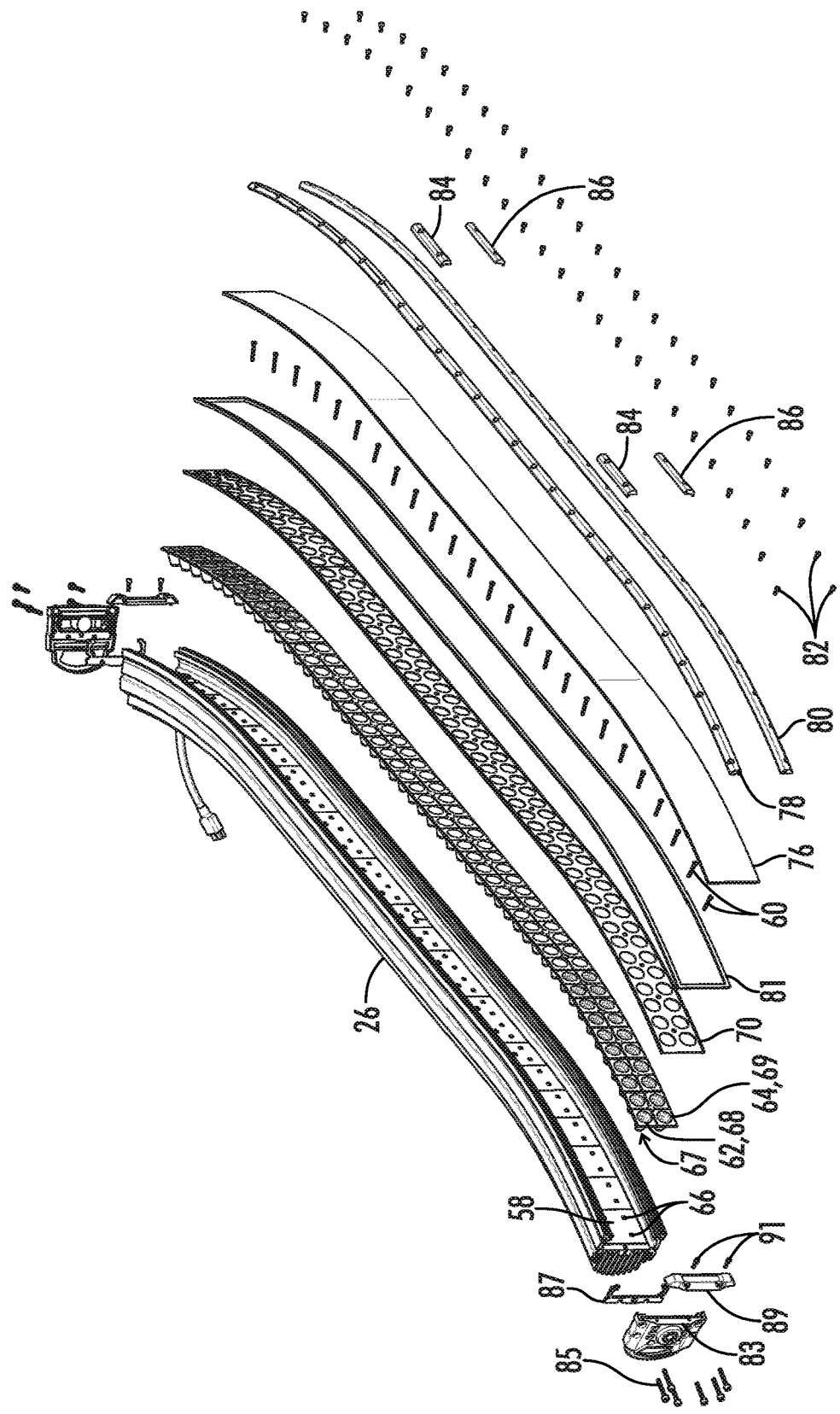
FIG. 5B is an exploded view of the lighting apparatus of FIGS. 3 and 4.

The internal components are best shown in the exploded view of FIG. 5B and the cross-sectional view of FIG. 7. An electronics board 58 may be attached to the central mounting wall 48. The electronics board 58 may be referred to as a mounting board 58. A plurality of light sources such as upper light source 62, and lower light source 64 seen in FIGS. 5B and 7 may be supported against the electronics board 58. Each light source, such as upper light source 62 may include an LED element 66 in the center thereof, and a generally conical shape reflector such as 68 or 69 surrounding and projecting forward from the electronics board 58. Reflectors 68 and 69 may be formed in a reflector array 67 as seen in FIG. 5B. A facia panel 70 may be received in front of the electronics housing chamber 56 around the front openings of the reflectors 68 and 69. Fasteners 60 may extend through the facia panel 70, reflector array 67, and electronics board 58 into holes in the frame 26 to secure the internal components to the frame 26.

A transparent cover 76 may be mounted on the frame 26 by placing the same against the forward faces of upper and lower walls 52 and 54 and retaining the same therein with upper and lower trim strips 78 and 80, respectively. The upper and lower trim scripts may be fastened to the upper and lower walls 52 and 54 with rivets, screws, or other suitable fasteners 82. A gasket 81 may be placed between the frame 26 and the transparent cover 76.

An end cap 83 may be attached to end 44 of frame 26 with fasteners 85. A gasket 87 may be placed between end cap 83 and frame 26. A front end trim piece 89 may be attached to end cap 83 with fasteners 91. Similar end components are attached to the other end 42 of frame 26.

In one embodiment, upper and lower support pads 84 and 86, respectively, may be attached to and protrude forward from the upper and lower trim strips 78 and 80, respectively. As best seen in FIGS. 3 and 4, the support pads such as 84 and 86 are located along the straight central portion 28 of frame 26. The support pads are located nearer to the first and second curved end portions 30 and 32 than to a centerline 88 of the frame 26. The support pads 84 and 86 may provide support for the lighting apparatus 10 if the same is laid face forward on a work table or other supporting surface during the assembly and mounting of the lighting apparatus 12.

As seen in FIG. 7, the cross-sectional shape of the frame 26 is such that a cross-sectional profile of the rear ends of the fins 50, as generally indicated by the dashed profile line 90 joining the rear ends of the fins 50, has an abrupt decrease in fin length indicated at 92 adjacent the upper and lower edges of the cross-section defined by the upper and lower walls 52 and 54, respectively.

As best shown in FIGS. 1 and 2, the lighting apparatus 12 includes first and second end brackets 93 and 94, respectively.

Figure 8A:
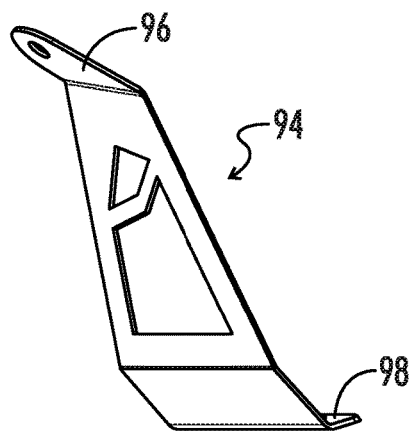
FIG. 8A is a perspective view of one of the mounting brackets.
Figure 8B:
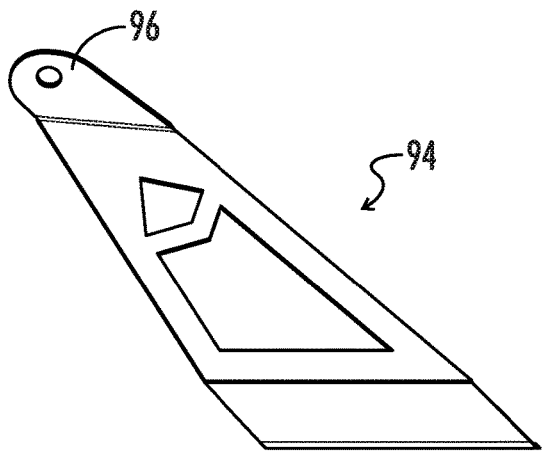
FIG. 8B is a side elevation view of the mounting bracket of FIG. 8A.
Figure 8C:
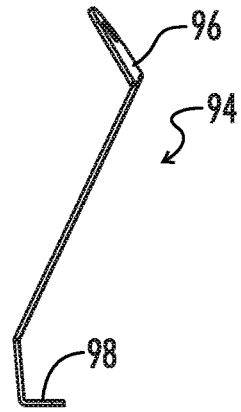
FIG. 8C is an end view of the mounting bracket of FIG. 8B.

FIG. 8A is a perspective view of the bracket 94 showing an upper flange 96 configured to attach to the end 44 of frame 26, and a lip 98 configured to attach to the A-pillar 22 on the passenger side of the truck cab 14. FIGS. 8B and 8C are side elevation and end elevation views, respectively, of the bracket 94.

Figure 6:
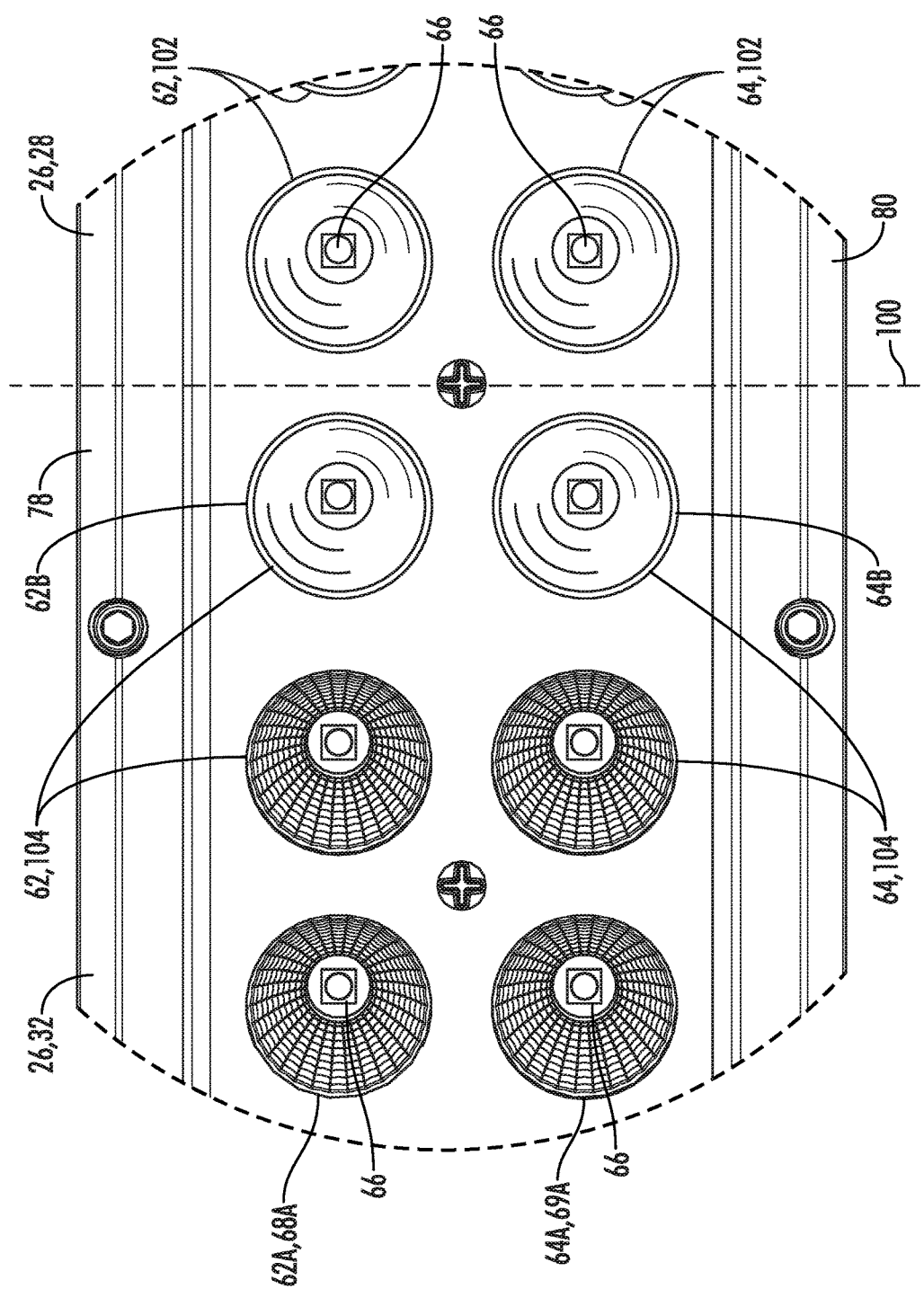
FIG. 6 is an enlarged view of a portion of the lighting apparatus.

Referring now to FIG. 6, an enlarged front elevation view is shown of an enlarged portion of the lighting apparatus 12, and particularly the portion which covers the transition between the straight central portion 28 of frame 26 and the second curved end portion 32 of frame 26. A phantom line 100 schematically illustrates the dividing line between the straight central portion 28 of frame 26 to the right of line 100, and the second curved end portion 32 of the frame 26 to the left of line 100.

As is seen in FIG. 6, the straight central portion 28 of frame 26 carries a plurality of central light sources including upper and lower horizontal arrays of the upper lights 62, and lower lights 64, respectively. The light sources, such as 62 and 64 mounted on the straight central portion 28 may be collectively referred to as a plurality 102 of central light sources. Similarly, the upper and lower light sources 62 and 64 mounted on the second curved end portion 32 of frame 26 may be referred to as a plurality 104 of second end portion light sources. Similarly, the light sources mounted on the first curved end portion 30 of frame 26 may be referred to as a plurality 106 of the first end portion light sources. These groupings 102, 104 and 106 are best shown in FIG. 5A.

The light sources mounted on the several portions of the frame 26 of the lighting apparatus 12 are preferably selected so as to take advantage of the particular geometry of the frame 26 so as to provide an improved illumination pattern as compared to prior lighting apparatus.

Figure 9:
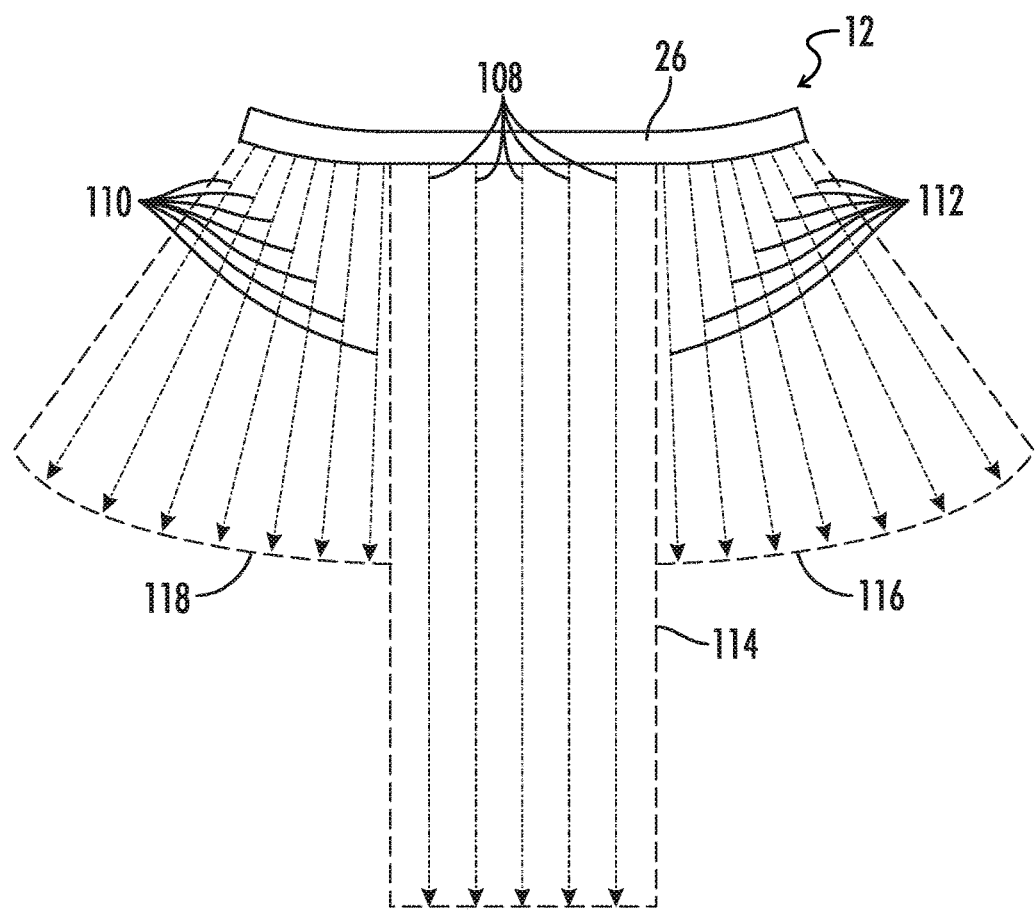
FIG. 9 is a schematic plan view showing the illumination pattern of the lighting apparatus.

The illumination pattern is best shown in FIG. 9. The plurality of central light sources 102 mounted on the straight central portion 28 of frame 26 preferably has each of its light sources mounted so as to have a light-emitting axis 108 projecting forward from and perpendicular to the central portion length 28 so that the light-emitting axes 108 of the plurality of central light sources 102 all project parallel to each other and directly ahead from the frame 26 and from the vehicle 10 upon which the lighting apparatus 12 is mounted.

In contrast, each of the second end portion light sources 104 mounted on the second curved end portion 30 has a light-emitting axis 110 projecting forward from and perpendicular to the second curved end portion 38 so that the axes 110 diverge from each other. Similarly, each of the first end portion light sources 106 have axes 112 projecting forward from and perpendicular to the first curved end portion 30 and diverging from each other.

Additionally, at least a majority, and preferably all of the central light sources 102 are spot light sources, whereas at least a majority of the first end portion light sources 106 and second end portion light sources 104 are diffuse light sources. As used herein, the term spot light sources and diffuse light sources are defined relative to each other, with the spot light sources being more directionally concentrated than the diffuse light sources.

As is best illustrated in FIG. 6, the upper and lower light sources 62A and 64A, respectively, shown on the leftmost side of FIG. 6 are diffuse light sources wherein their reflectors 68A and 69A have roughened dimpled interior surfaces so as to diffuse the light being emitted by their respective LEDs 66. By contrast, all of the light sources 62 and 64 of the central light source 102 have their reflectors constructed to be relatively smooth and shiny so as to reflect the light from their LEDs more directly outward.

By combining spot light sources with the straight central portion 28 of the frame 26 of lighting apparatus 12, and diffuse light sources with the curved end portions 30 and 32 of the frame 26 of lighting apparatus 12, a wide uniform deep path of illumination 114 is provided directly in front of the lighting apparatus 12 and the vehicle 10 as schematically illustrated in FIG. 9. Shorter but more widely diffused peripheral paths of illumination 116 and 118 are provided to the sides of the lighting apparatus 12 and the vehicle 10, again as schematically illustrated in FIG. 9.

More generally, a preferred embodiment of the invention may provide that a majority of the plurality of central portion light sources 102 are each a spot light source, and at least a majority of the plurality of first end portion light sources 106 and second end portion light sources 104 are each a diffuse light source.

In another embodiment, all of the central light sources may be spot light sources.

In another embodiment, the plurality of second end light sources 104, such as seen in FIG. 6 may include at least one spot light source indicated as 62B and 64B adjacent the central light sources 102. In this embodiment, because the curved end portions such as 30 and 32 have developed only very slight curvature at the location of the light sources 62B and 64B adjacent the dividing line 100, light sources near the dividing line 100 may selectively be chosen either as spot light sources to contribute to the wide uniform deep path of illumination 114, or as diffuse light sources to contribute to the shorter, but more widely dispersed peripheral light paths 116 and 118. It is noted that in FIG. 6 only one light source 62B and 64B of each of the upper and lower rows of light sources of the plurality of second end light sources 104 is shown as being a spot light source. In FIG. 5A there are three upper and three lower spot light sources in the plurality of second end light sources 104.

Thus it is seen that the apparatus disclosed herein readily meets the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention is defined by the appended claims.

What is claimed is:

1. A lighting apparatus for mounting on a vehicle cab, the apparatus comprising:

a frame having a straight central portion and first and second curved end portions on either end of the straight central portion, the straight central portion having a central portion length, the frame having a forward facing light mounting surface, the first and second curved end portions being curved rearwardly relative to the straight central portion;

a plurality of central light sources mounted on the straight central portion, the central light sources each having a light emitting axis projecting forward from and perpendicular to the central portion length so that the light emitting axes of the plurality of central light sources project parallel to each other;

a plurality of first end portion light sources mounted on the first curved end portion; and a plurality of second end portion light sources mounted on the second curved end portion;

wherein the frame includes cooling fins extending rearward, the frame having a cross-section shape such that a cross-sectional profile of the rear ends of the fins as defined by an imaginary profile line joining the rear ends of the fins has a decrease in fin length adjacent upper and lower edges of the cross section causing a concave step in the imaginary profile line.

2. The apparatus of claim 1, wherein:
the frame is a continuous extrusion from an end of the first curved end portion to an end of the second curved end portion.

3. The apparatus of claim 1, further comprising:
a transparent cover mounted on the frame in front of the light sources;
upper and lower trim strips attached to upper and lower front edges of the frame to retain the transparent cover; and
upper and lower support pads protruding forward from the upper and lower trim strips, respectively, the support pads being located along the straight central portion of the frame nearer to the first and second curved end portions than to a center of the frame.

4. The apparatus of claim 1, further comprising:
first and second end brackets, each bracket having an upper flange configured to attach to ends of the first and second curved end portions of the frame, and each bracket having a lip configured to attach to an A-pillar of the vehicle cab on which the apparatus is to be mounted.

5. The apparatus of claim 1, wherein:
the frame has a frame length from an end of the first curved end portion to an end of the second curved end portion, and the central portion length is at least 40% of the frame length.

6. The apparatus of claim 5, wherein:
the central portion length is at least 45% of the frame length.

7. The apparatus of claim 5, wherein:
the central portion length is at least 22 inches.

8. The apparatus of claim 7 wherein:
each of the first and second curved end portions of the frame has an end portion length of at least 12 inches.

9. The apparatus of claim 1, wherein:
at least a majority of the central light sources are each a spot light source;
at least a majority of the first end portion light sources are each a diffuse light source;
at least a majority of the second end portion light sources are each a diffuse light source; and
the spot light sources and diffuse light sources are defined relative to each other, with the spot light sources being more directionally concentrated than the diffuse light sources.

10. The apparatus of claim 9, wherein:
the plurality of first end portion light sources includes at least one spot light source adjacent the central light sources; and
the plurality of second end portion light sources includes at least one spot light source adjacent the central light sources.

11. The apparatus of claim 9, wherein:
the first end portion light sources each have a light emitting axis projecting forward from and perpendicular to the first curved end portion; and
the second end portion light sources each have a light emitting axis projecting forward from and perpendicular to the second curved end portion.

12. The apparatus of claim 9, wherein:
all of the central light sources are spot light sources.

13. The apparatus of claim 12, wherein:
the plurality of first end portion light sources includes at least one spot light source adjacent the central light sources; and
the plurality of second end portion light sources includes at least one spot light source adjacent the central light sources.

* * * * *